UNITED STATES PATENT OFFICE.

MOVSESS B. ADOM, OF WHITE PLAINS, NEW YORK.

COMPOSITION FOR MAKING SOUND-RECORDS.

1,202,638.  Specification of Letters Patent.  Patented Oct. 24, 1916.

No Drawing.  Application filed June 4, 1915.  Serial No. 32,190.

*To all whom it may concern:*

Be it known that I, MOVSESS B. ADOM, a citizen of the United States, and a resident of White Plains, in the county of Westchester and State of New York, have invented a new and Improved Composition for Making Sound-Records, of which the following is a full, clear, and exact description.

My invention relates to composition of matter for sound records, and has for its object the provision of an inexpensive composition easily impressible by the needle of a sound-recording tool and which will harden after impression to such an extent as to be unaffected by the needle of a sound-reproducing instrument. The composition I prefer to use is collodion mixed with a hardener and applied to a suitable base which forms a support for the composition.

The ordinary collodion being too soft and too thin, I form it as follows: Pyroxylin is dissolved in three parts of ether mixed with one part of alcohol, to which three per cent. of Venetian turpentine is added, and also two per cent. of castor oil to make the coating consistent and flexible. To render the collodion hard as it dries, I use a soluble aluminum salt, preferably aluminum chlorid. This makes the emulsion as its sets hard and almost brittle, but not hard enough to crack if the emulsion is mounted on a flexible support. The added aluminum salt forms only one per cent. of the collodion.

The composition when formed and coated on a suitable base is easily impressible by the needle of a sound-recording instrument. The impressed coating will dry within two or three minutes under normal atmospheric conditions, but it can be dried more rapidly by subjecting it to a hot-air current or any other suitable drying means. This emulsion is primarily intended to be used in connection with a celluloid support of the type used for continuous photographic films, so as to provide a continuous sound record. It is self-evident that it can be used on any other support to which the emulsion will easily adhere. Or, means can be used for causing the adherence of this composition to the support.

I claim:

A composition for sound-recording surfaces, comprising pyroxylin, ether, alcohol, turpentine, castor oil, and aluminum chlorid in proportions substantially as described.

In testimony whereof I have signed my name to this specification in the presence of two subscribing witnesses.

MOVSESS B. ADOM.

Witnesses:
 B. JOFFE,
 PHILIP D. ROLLHAUS.